United States Patent [19]

Lane

[11] Patent Number: 4,660,379
[45] Date of Patent: Apr. 28, 1987

[54] AIRTRAP POWER GENERATOR

[76] Inventor: James K. Lane, 116 E. Columbine Rd., Wildwood Crest, N.J. 08260

[21] Appl. No.: 809,973

[22] Filed: Dec. 17, 1985

[51] Int. Cl.⁴ ............................................. F16D 31/02
[52] U.S. Cl. ........................................ 60/398; 60/326
[58] Field of Search .................. 60/325, 326, 398, 715

[56] References Cited

U.S. PATENT DOCUMENTS

| 3,601,979 | 8/1971 | Singer | 60/326 |
| 4,514,977 | 5/1985 | Bowen | 60/398 |

*Primary Examiner*—Stephen F. Husar
*Attorney, Agent, or Firm*—Norman E. Lehrer

[57] ABSTRACT

Liquid in a closed tank is forced and displaced out the bottom thereof by compressed air and gravity. The liquid flows to a riser and to the top of a penstock where it falls freely to a turbine in an airtight housing. The fallen liquid is displaced by trapped air pressure into a second tank which is being evacuated of air. When the second tank is full of liquid, valves reverse the air pressure between the two tanks and the operation continues. The turbine may be used to directly power various types of machinery or to produce electricity by driving a generator.

3 Claims, 1 Drawing Figure

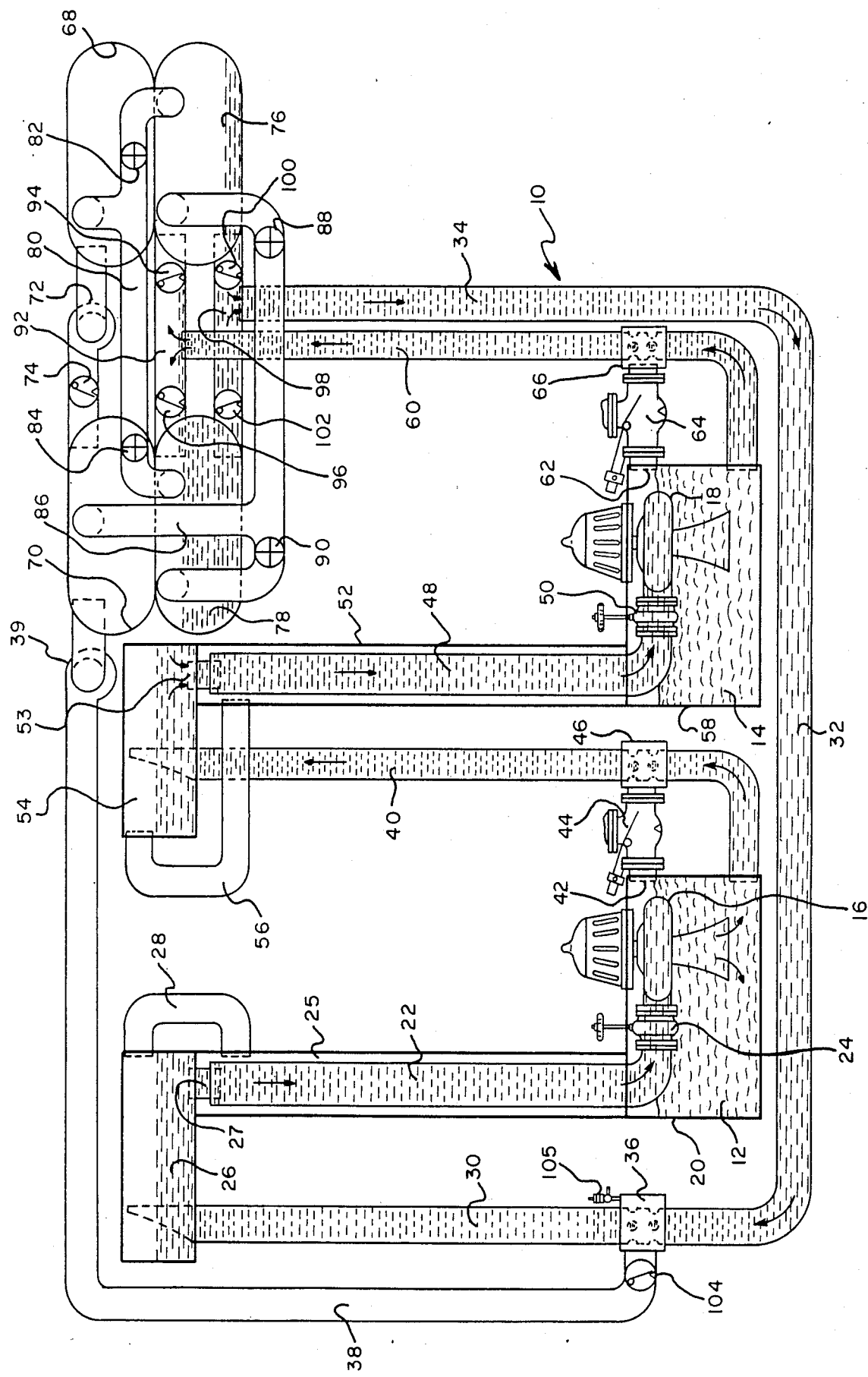

AIRTRAP POWER GENERATOR

BACKGROUND OF THE INVENTION

The present invention is directed toward a power generator and more particularly to a device which utilizes air and water or other liquid in an enclosed system to generate power by allowing gravity to move water down through a penstock and through a water turbine or similar device. An electric generator may be attached to and driven by the turbine to generate electricity.

Inventions relating to the subject matter of the present invention have been proposed in the past. Some of these are described, for example, in British Pat. Nos. 7,287 (1893); 16,385 (1900); and 146,798 (1920). While appearing good on paper, these prior proposed inventions could not possibly be practical. Each of them requires the direct lifting of water by a pumping means or the like. Because pumping means are utilized to lift the water, the amount of power and energy which goes into the system exceeds the useful power generated thereby.

SUMMARY OF THE INVENTION

The present invention overcomes the problems of the prior art described above and is capable of generating an amount of power which exceeds the external power input needed to activate the generator. In accordance with the present invention, a vacuum pump continuously evacuates the air from a vacuum vessel while simultaneously pressurizing an air pressure vessel. Liquid in one of two liquid accumulator tanks is displaced and forced out of the bottom thereof by gravity and the compressed air from the air pressure tank. The liquid flows up a riser and falls into a penstock where it then falls freely into and through a turbine for generating power. The fallen liquid is displaced upwardly into the second liquid accumulator tank as a result of the reduced air pressure therein. When the second accumulator tank is full of liquid, valves reverse the flow of air and liquid between the two tanks and the operation continues. An air compressor continuously supplies air from an air pressure vessel, thence through liquid level controls thereby maintaining air pressures and liquid levels throughout the airtrap power generator. The turbine may be used to directly power machinery or to produce electricity. Furthermore, a plurality of identical penstocks and turbines and related equipment may be placed in series to drive a plurality of generators.

BRIEF DESCRIPTION OF THE DRAWING

For the purpose of illustrating the invention, there is shown in the accompanying drawing one form which is presently preferred; it being understood that the invention is not intended to be limited to the precise arrangements and instrumentalities shown.

The sole FIGURE is a schematic representation of an airtrap power generator constructed in accordance with the principles of the present invention.

DETAILED DESCRIPTION OF THE PREFERRED EMBODIMENT

Referring now to the drawing in detail, there is shown in the sole FIGURE a schematic representation of a power generator constructed in accordance with the principles of the present invention and designated generally as 10. Airtrap power generator 10 includes a series of chambers 12 and 14 housing turbines 16 and 18. It should be pointed out that while two such chambers 12 and 14 are shown, the invention is equally applicable to the use of a single chamber or more than the two chambers shown. When more than one chamber is utilized, they are arranged in series with the output of one chamber being connected to the input of the next as will become clearer hereinafter.

The two chambers 12 and 14 are constructed in substantially the identical manner. Accordingly, it is believed that a description of one of the chambers should be sufficient, it being understood that the second chamber is similarly constructed.

Chamber 12 includes an outer shell or housing 20 which is totally air and liquid tight. Located within the housing 20 is the turbine 16 which has its input connected to the lower end of penstock 22 through valve 24. The output of the turbine 16 opens directly into the housing 20.

The penstock 22 extends upwardly from the forward end of the housing 20 and is encased by an air casing 25. The upper end of the penstock 22 is connected by an air gap 27 to the bottom of an air trap 26. The upper end of the air trap 26 is connected to the upper end of the air casing 25 through bypass pipe 28.

Located forwardly of the chamber 12 is a riser 30. The upper end of riser 30 is connected to the air trap 26 and the lower end is connected through pipe 32 to the bottom of the downcomer pipe 34. A liquid level control device 36 is connected to the riser 30 and is supplied with air through pipe 38 from air compressor 39.

The lower rear or output end of the housing 20 is connected to riser 40 which leads to the second chamber 14. The upper end of the housing 20 has an outlet 42 connected through check valve 44 to liquid level control 46 which feeds into the riser 40.

As stated above, the second chamber 14 is constructed in substantially the same manner as the first chamber 12. Chamber 14 also includes a turbine 18 having its input connected to penstock 48 through valve 50. Also included are an air casing 52, air gap 53, air trap 54 and a bypass pipe 56. The bottom rear of the housing 58 is connected to the lower portion of riser 60 and the outlet 62 adjacent the top of the housing 58 is connected through check valve 64 to the liquid level control 66 which is intended to let air escape from chamber 14 into the riser 60 as will be explained more fully hereinafter.

Shown in the upper righthand portion of the figure is the driving section of the airtrap power generator 10. This section is comprised of a vacuum vessel 68 and an air pressure vessel 70. An air compressor or vacuum pump 72 continuously withdraws air from the vacuum vessel 68 and forces it into the air pressure vessel 70 through the check valve 74.

The driving section also includes a pair of liquid accumulator tanks 76 and 78. A pipe 80 connects the vacuum vessel 68 to the upper portions of the liquid accumulator tanks 76 and 78 through solenoid operated valves 82 and 84 respectively. Similarly, pipe 86 connects the air pressure vessel 70 to the tops of the liquid accumulator tanks 76 and 78 through solenoid operated valves 88 and 90 respectively. The tops of the liquid accumulator tanks 76 and 78 have a pipe 92 connected therebetween. The upper end of the riser 60 is connected to the pipe 92 and liquid mixed with air in the riser 60 can pass into either tank 76 or tank 78 through check valves 94 and 96. Similarly, pipe 98 is connected between the lower portions of the tanks 76 and 78 and is also connected to the upper end of the downcomer pipe 34. Liquid from either tank 76 or 78 can pass out of the tank into the downcomer pipe 34 through check valves 100 and 102.

The airtrap power generator described above operates in the following manner. Initially the flow activation section and the power generation section must be charged with liquid and air while sealed from outside atmosphere in order to place the plant into operation. This is accomplished by pumping water or other liquid through a filling line into liquid accumulation tank 78. While charging with liquid, valves 82 and 90 are closed and all other solenoid operated valves are open. This will allow levels of liquid in all parts of the plant to stabilize at their proper positions and to be held in place by the check valves and by air being trapped in upper parts of the sealed chambers. The air is pressurized by being displaced from the lower parts of the chamber by the injection of the liquid.

As water is injected into the liquid accumulation tank 78, it can only leave the tank through check valve 102 into downcomer 34. The water then enters riser 30 and rises to enter air trap 26. The water then drops freely through the outlet of the air trap 26 through air gap 27 into penstock 22. The free falling water through penstock 22 enters the water turbine 16 and is discharged into the bottom of the housing 20. The water rises in housing 20 and in riser 40 until the level in the housing 20 reaches the bottom of the outlet 42 at which point air trap 26 is sealed and no further air can escape.

Water continues to rise in riser 40 and eventually flows into air trap 54. The water then drops freely through the outlet from air trap 54 through air gap 53 into penstock 48 through turbine 18. The water continues to flow until the level in chamber 14 reaches the bottom of the air outlet 62 at which point air trap 54 is sealed and no further air can escape.

Water continues to rise in riser 60 and eventually flows through check valve 94 into liquid accumulation tank 76. Filling is continued until liquid accumulation tank 78 is approximately 66% full and number 76 is approximately 66% full. At this point the plant is ready to have power applied to the flow activation section.

The purpose of the flow activation section is to establish and maintain the flow of liquid through the power generation units.

To do this, air compressor 72 is started which takes air from vacuum vessel 68 and discharges it through check valve 74 into pressure vessel 70. Air then leaves vessel 70 through solenoid control valve 88 into the liquid accumulation tank 76 where it maintains a pressure of zero plug psig in tank 76.

Water is forced out of accumulation tank 76 through check valve 100 into downcomer 34 through line 32 into riser 30 and air trap 26. The water continues to flow taking the same path as described in the previous filling method until it reaches the top of riser 60. At this point the water then flows through check valve 96 into liquid accumulation tank 78. Water rises in tank 78 while air is evacuated through solenoid control valve 84 into vacuum vessel 68.

When the water level in water accumulation tank 78 reaches the "full" level, a float control device trips four mercury switches. The mercury switches are positioned so that when all are tripped by the same float level control, each operates a separate solenoid controlled valve i.e. valve numbers 82, 84, 88 and 90. In this instance, when the water level in tank 78 reaches "full" the mercury switches operate to close valves 84 and 88 and simultaneously opens valves 82 and 90. This causes a vacuum to be applied to water accumulation tank 76 and a pressure to be applied to tank 78.

Water now leaves tank 78 through check valve 102 into downcomer 34 and follows the same path previously described. The water returns through the power generation units to riser 60 and through check valve 94 into tank 76. The flow of water is now established and continues as long as pressure and vacuum is maintained alternately in tanks 76 and 78. The flow of air from tank 68 through compressor 72 and through check valve 74 into tank 70 is continuous and never changes direction.

The air compressors may be, for example, two 185 h.p. positive displacement air pumps which will move in excess of 12,000 cu. ft/min from vacuum vessel 68 into air pressure vessel 70 and then from air pressure vessel 70 through liquid level control 36. When a vacuum is applied to either liquid accumulation tank 78 or 76, the air volume in air trap 54 expands; including the air volume in the air trap bypass 56, in penstock air casing 52 and in chamber 14. This expansion of air forces the water level down in chamber 14 until air escapes through the water level control 62 through check valve 64 into the air lift pump 66 of the riser 60. The air rising through the riser 60 because of its buoyancy, reduces the back pressure and causes an increase in velocity of the water rising in riser 60. This causes an equal increase of air volume in air trap 26 which results in a simultaneous flow through air trap 26 in the same manner as through air trap 54. The same action occurs through check valve 104 and riser 30. In order to prevent the air pressure in line 38 from exceeding 18 psig, air relief valve 105 is connected to the liquid level control device. A pipe not shown connects the output of the air relief valve 105 to vacuum vessel 68 through pipe 80.

The rate of flow through the plant in this embodiment is approximately 90,000 gallons per minute which has a power generation potential of about 680 h.p. for each power generation unit installed. The power is generated as the water falls freely through the penstock and turbine suspended in the air trap section of each power generation unit. The power generation units are arranged in series with the outlet of each unit feeding into the inlet of the next unit in line. The number of units used is determined by the amount of power desired to be generated. Additional units attached in series with the others do not require any increase of manufactured air pressure because each and every limit is placed on the same elevation as the others thereby producing the same internal levels and pressures.

As should be readily apparent, all pressures volumes and levels within the power generator are controlled by the shapes, locations and elevations of the various vessels and pipes and, therefore, operate independently of all outside pressures. The only outside force which effects the internal flow is gravity. The forces which effect the internal liquid levels, flows and pressures, inside and through the chambers and traps are mechanically compressed air, buoyancy and gravity. Mechanically compressed air is the only one of these three forces which requires a source of manufactured power. Buoyancy and gravity, of course, occur naturally.

The present invention may be embodied in other specific forms without departing from the spirit or essential attributes thereof and accordingly, reference should be made to the appended claims rather than to the foregoing specification as indicating the scope of the invention.

I claim:

1. A power generating device comprising:
   an airtight housing;
   a turbine located within said housing and including an inlet pipe extending upwardly out of said housing and forming a penstock, the output of said turbine opening into said housing;
   an air trap means located at the top of said inlet pipe with the lower portion of the interior of said trap means being in communication with said inlet pipe;
   an air pipe connected between the top of said air trap means and the top of said housing;
   a riser pipe having its upper end connected to said air trap means;
   a liquid level control device connected to the lower end of said riser;
   first and second liquid accumulator tanks;
   a tank inlet pipe having its lower end connected to the bottom of said housing and its upper end connected to the top of each of said first and second tanks through a first pair of check valves;
   a first compressor means for alternately evacuating the air from one of said first or second accumulator tanks while discharging compressed air into the other of said tanks;
   a second compressor means for continuously supplying air to said liquid level control device;
   a tank outlet pipe having its upper end connected to the bottoms of said accumulator tanks through a second pair of check valves, and having its lower end connected to the lower end of said riser;
   liquid initially filling one of said tanks, said housing, said riser and said inlet and outlet pipes;
   whereby when compressed air is discharged into the accumulator tank filled with liquid, the liquid is displaced out through the outlet pipe to the riser and into the air trap means where it falls through the turbine inlet pipe into the turbine and then to the housing, the liquid at the bottom of the housing flowing through the tank inlet pipe to the accumulator tank having the air evacuated therefrom.

2. The power generating device as claimed in claim 1 further including an electric generator connected to said turbine so as to be rotated thereby.

3. The power generating device as claimed in claim 1 including a plurality of similarly constructed housings and turbines connected in series with each other.

* * * * *

UNITED STATES PATENT AND TRADEMARK OFFICE
CERTIFICATE OF CORRECTION

PATENT NO. : 4,660,379

DATED : April 28, 1987

INVENTOR(S) : James K. Lane

It is certified that error appears in the above-identified patent and that said Letters Patent is hereby corrected as shown below:

Column 3, line 53, "plug" should read --plus--;

Column 4, line 51, "limit" should read --unit--.

Signed and Sealed this

Eleventh Day of October, 1988

Attest:

DONALD J. QUIGG

*Attesting Officer*  *Commissioner of Patents and Trademarks*